(12) United States Patent
Okabe (10) Patent No.: US 10,067,327 B2
(45) Date of Patent: Sep. 4, 2018

(54) IMAGE ACQUISITION APPARATUS (71) Applicant: OLYMPUS CORPORATION, Tokyo (JP)

(72) Inventor: Masashi Okabe, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 135 days.

(21) Appl. No.: 14/712,266

(22) Filed: May 14, 2015

(65) Prior Publication Data
US 2015/0355443 A1 Dec. 10, 2015

(30) Foreign Application Priority Data

Jun. 10, 2014 (JP) .................................. 2014-119624

(51) Int. Cl.
G02B 21/00 (2006.01)
H04N 5/232 (2006.01)
H04N 5/235 (2006.01)

(52) U.S. Cl.
CPC ......... G02B 21/008 (2013.01); H04N 5/2355 (2013.01); H04N 5/23238 (2013.01); H04N 5/2353 (2013.01); H04N 5/23296 (2013.01)

(58) Field of Classification Search
CPC ... G06T 7/0022; G06T 7/0018; G02B 21/008; H04N 5/23238; H04N 5/2355; H04N 5/2353; H04N 5/23296
See application file for complete search history.

(56) References Cited

U.S. PATENT DOCUMENTS

2006/0177150 A1* 8/2006 Uyttendaele .......... G06T 3/4038
382/284
2013/0070075 A1* 3/2013 Kakemizu ............ G02B 21/365
348/79
(Continued)

FOREIGN PATENT DOCUMENTS

JP 2000-013675 A 1/2000
JP 2002-218317 A 8/2002
(Continued)

OTHER PUBLICATIONS

Japanese Office Action dated Jan. 16, 2018 in Japanese Patent Application No. 2014-119624.

Primary Examiner — Christopher S Kelley
Assistant Examiner — Nasim Nirjhar
(74) Attorney, Agent, or Firm — Scully, Scott, Murphy & Presser, P.C.

(57) ABSTRACT

To acquire a pasted image having an enlarged dynamic range and having a high quality and a high angle of view, an image acquisition apparatus includes an imaging unit that captures an object, to acquire an image, an imaging control unit that controls the imaging unit, an HDR processing unit that combines a plurality of partial images acquired by capturing the same region of the object under different exposures, to generate an HDR image having an enlarged dynamic range, a pasting processing unit that pastes the plurality of HDR images generated for different regions of the object, to acquire a pasted image having a higher angle of view, and an exposure setting unit that sets an exposure condition in capturing all the partial images based on image information acquired by capturing a wider range than the single partial image included in the pasted image.

7 Claims, 11 Drawing Sheets (56) References Cited

U.S. PATENT DOCUMENTS

2013/0229546 A1     9/2013   Furumura et al.
2013/0271631 A1* 10/2013   Tatsuzawa ........... H04N 5/2353
                                                                                 348/296

FOREIGN PATENT DOCUMENTS

| JP | 2006-245921 A | 9/2006 |
| JP | 2010-114599 A | 5/2010 |
| JP | 2012-080432 A | 4/2012 |
| JP | 2013-068738 A | 4/2013 |
| JP | 2013-162188 A | 8/2013 |

* cited by examiner

SIMPLEST LINEAR CONVERSION

FIG. 4B

SUCH NON-LINEAR CURVE LOOKS MORE NATURAL

FIG. 4C

ALTERNATIVE TO APPROXIMATE NON-LINEAR CURVE BY COMBINING A PLURALITY OF LINEAR FUNCTIONS LOOKS QUITE WELL

FIG. 5

HISTOGRAM OF 16-bit IMAGE

FIG. 6A
FOR LOW LUMINANCE

FIG. 6B
FOR INTERMEDIATE LUMINANCE

FIG. 6C
FOR HIGH LUMINANCE

| | ZOOM OPTICAL SYSTEM 1 | ZOOM OPTICAL SYSTEM 2 | ... |
|---|---|---|---|
| OBJECTIVE LENS A | 1 | 1.2 | 1.4 |
| OBJECTIVE LENS B | 1.2 | 1.4 | 1.6 |
| OBJECTIVE LENS C | 1.4 | 1.6 | 1.8 |
| ... | | | |

FIG. 11

IMAGE ACQUISITION APPARATUS

CROSS-REFERENCE TO RELATED APPLICATIONS

This application is based on Japanese Patent Application No. 2014-119624, the contents of which are incorporated herein by reference.

TECHNICAL FIELD

The present invention relates to an image acquisition apparatus.

BACKGROUND ART

Conventionally, high dynamic range (HDR) processing for acquiring and combining a plurality of images, which differ in exposure condition, to enlarge a dynamic range has been known (e.g., PTL 1). In normal HDR processing, a correct exposure is detected when an image is acquired, and the image is captured under the detected correct exposure and exposures higher and lower than the correct exposure.

CITATION LIST

Patent Literature

{PTL 1}
Japanese Unexamined Patent Application, Publication No. 2013-068738

SUMMARY OF INVENTION

In view of the aforementioned circumstances, the present invention is directed to providing an image acquisition apparatus capable of acquiring a pasted image having an enlarged dynamic range and having a higher quality and a higher angle of view.

Solution to Problem

The present invention provides the following means.

According to an aspect of the present invention, an image acquisition apparatus includes an imaging unit that captures an object, to acquire an image, an imaging control unit that controls the imaging unit, an HDR processing unit that combines a plurality of partial images acquired when the imaging unit captures the same region of the object under different exposures, to generate an HDR image having an enlarged dynamic range, a pasting processing unit that pastes the plurality of HDR images generated for different regions of the object together by the HDR processing unit, to acquire a pasted image having a higher angle of view, and an exposure setting unit that sets an exposure condition in capturing all the partial images based on image information acquired when the imaging unit captures a wider range than the single partial image included in the pasted image.

According to this aspect, the plurality of partial images are acquired when the imaging unit captures the same region of the object under different exposure conditions using the exposure condition set by the exposure setting unit. The acquired plurality of partial images are combined in the HDR processing unit, to generate the HDR image. The HDR images are respectively generated for the different regions of the object, and the generated plurality of HDR images are pasted together in the pasting processing unit. Thus, the pasted image having a high angle of view is acquired.

In this case, the exposure condition in acquiring all the partial images is set based on the image information obtained by capturing the wider range than the single partial image. Thus, the pasted image having a high quality can be obtained because the HDR images can be pasted together so that the brightness of the pasted image does not change for each of the HDR images and boundary lines among the HDR images do not become clear even by pasting processing. In this case, the exposure condition is not based on image information in a range of the single partial image but based on the image information obtained by capturing the wider range than the single partial image. Even if the exposure condition greatly changes with location within a range of the pasted image, therefore, a common exposure condition under which a dynamic range can be enlarged can be set.

DESCRIPTION OF EMBODIMENTS (First Embodiment)

An image acquisition apparatus according to a first embodiment of the present invention will be described below with reference to the drawings. In the present embodiment, an example in which the image acquisition apparatus is applied to a microscope system will be described.

Figure 1:
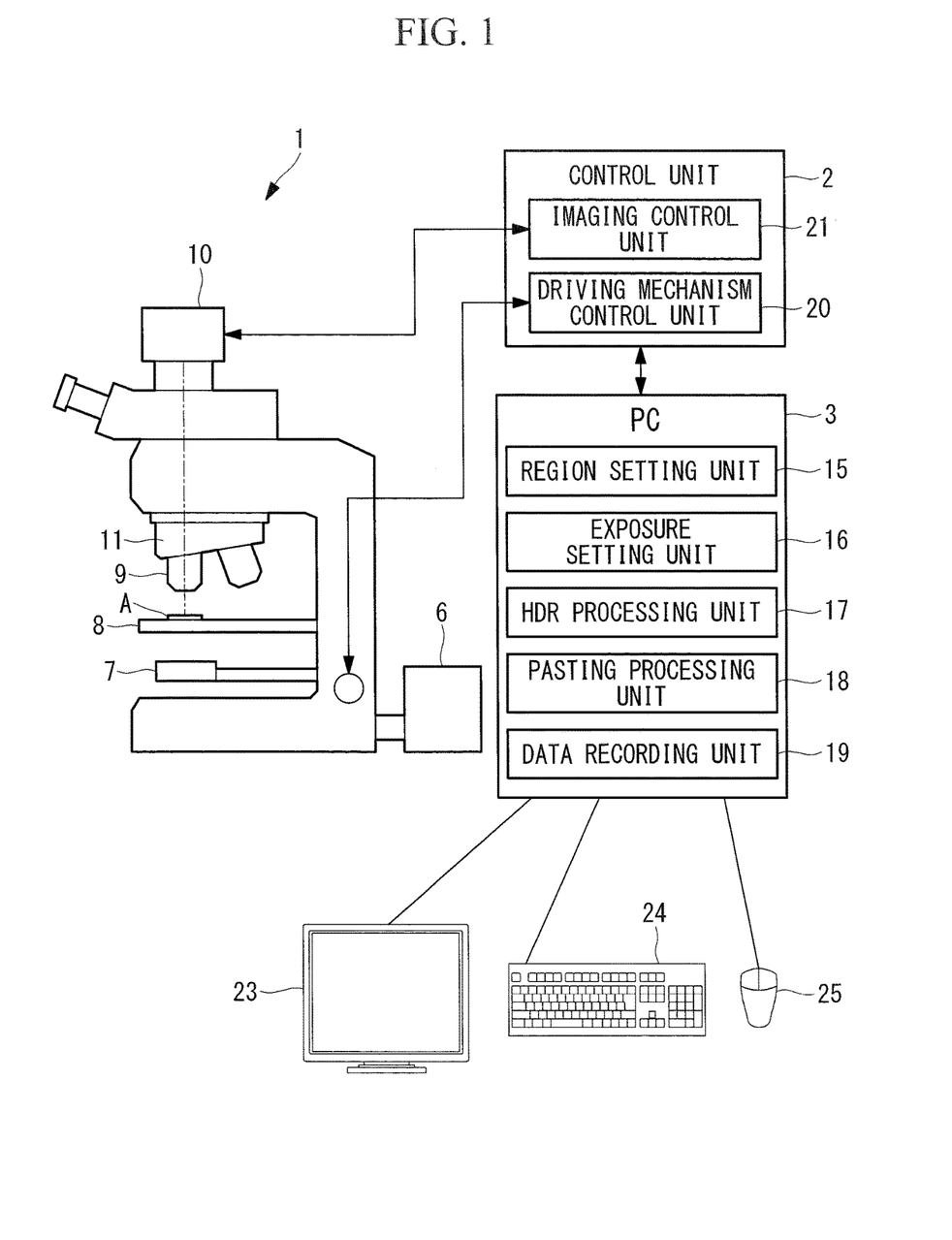
FIG. 1 is an entire configuration diagram illustrating an image acquisition apparatus according to a first embodiment of the present invention.

As illustrated in FIG. 1, the microscope system includes a microscope 1 that captures an optical image of a sample A serving as an object to acquire an image, a control unit 2 that controls the microscope 1, and a computer (personal computer (PC)) 3 connected to the control unit 2 and functioning as an image processing unit that subjects the image acquired by the microscope 1 to predetermined processing while acquiring a pasted image having a high angle of view based on the image of the sample A acquired by the microscope 1.

In the microscope 1, illumination light emitted from a light source 6 illuminates the sample A installed in a stage 8 via a condenser unit 7, and an optical image of the sample A is formed on an imaging plane of an imaging unit 10 via a plurality of objective lenses 9 and an imaging lens (not illustrated) (an optical system) mounted on a revolver 11. The imaging unit 10 acquires the optical image as an image.

The revolver 11 can select one of the plurality of objective lenses 9 by rotating, and corresponds to a magnification change unit capable of changing an imaging magnification.

The stage 8 in the microscope 1 is provided with a motor (not illustrated). A driving mechanism control unit 20 drives the motor, to move the sample A placed on the stage 8 along an optical axis of the objective lens 9 (in a Z-direction) relative to the optical system including the objective lens 9 and the imaging lens. The stage 8 is also movable in two directions (an X-direction and a Y-direction) perpendicular to the optical axis of the objective lens 9.

The imaging unit 10 is a digital camera including an image sensor such as a charge coupled device (CCD) or a complementary metal oxide semiconductor (CMOS), and captures the formed optical image and outputs the captured optical image as a digital image to an imaging control unit 21 in the control unit 2. The imaging control unit 21 controls the imaging unit 10. The imaging control unit 21 sets an exposure condition (an exposure time, a diaphragm, and International Organization for Standardization (ISO) sensitivity) in the imaging unit 10 according to an instruction from the computer 3, described below, and performs development processing for the captured image and outputs the image after the development processing to the computer 3.

The control unit 2 includes the imaging control unit 21 that controls the imaging unit 10 and the driving mechanism control unit 20 that controls the stage 8. The imaging control unit 21 and the driving mechanism control unit 20 respectively control the imaging unit 10 and the stage 8, to capture the image of the sample A serving as the object. More specifically, the control unit 2 controls the imaging unit 10, to acquire the image of the sample A under the set exposure condition and magnification, and output the acquired image to the computer 3.

The computer 3 includes a central processing unit (CPU) serving as a calculation unit, and performs predetermined image processing for the image input from the imaging control unit 21 while integrally controlling the control unit 2, a monitor 23, a keyboard 24, and a mouse 25 connected to the computer 3. A general-purpose or dedicated computer can be applied as the computer 3. The CPU executes various control programs, e.g., generates a pasted image having a higher angle of view from the image acquired by the imaging unit 10 in addition to performing predetermined image processing for the image of the sample A acquired by the imaging unit 10.

The computer 3 includes a region setting unit 15, an exposure setting unit 16, a HDR processing unit 17, a pasting processing unit 18, and a data recording unit 19 as processing units to be implemented when the CPU rasterizes and executes the predetermined program.

Figure 2:
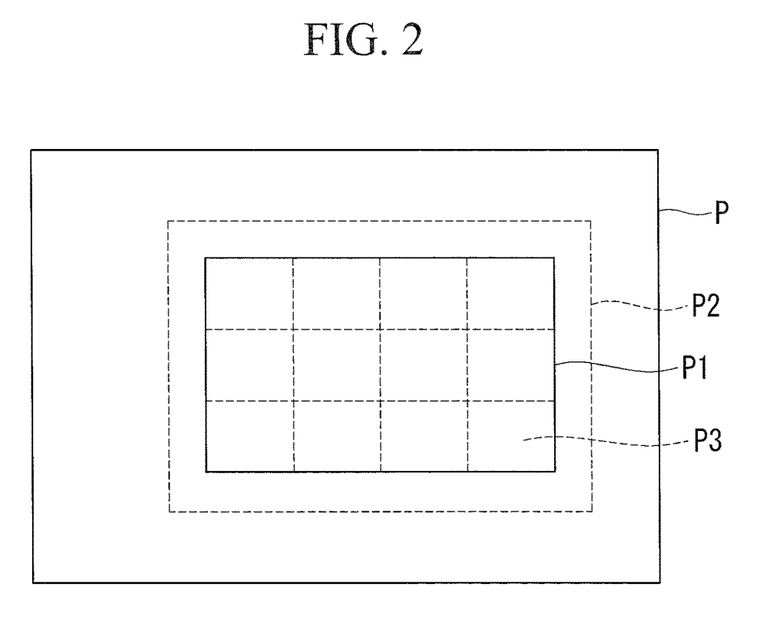
FIG. 2 illustrates regions of an image acquired in the image acquisition apparatus according to the first embodiment of the present invention.

The region setting unit 15 sets a region where the pasted image is acquired, a region of a partial image included in the pasted image, and a range as a reference for setting the exposure condition, and transmits set information to the imaging control unit 21. As the range for setting the exposure condition, at least a wider range than the single partial image included in the pasted image needs to be set, and is determined depending on the type of the sample A to be acquired and the pasted image to be acquired. In the present embodiment, a slightly wider range than a region P1 of the pasted image to be acquired (hereinafter referred to as an "pasted image region") is set as a region P2 for exposure setting (hereinafter referred to as an "exposure setting image region"), as illustrated in FIG. 2. The set region is transmitted to the imaging control unit 21.

The exposure setting unit 16 sets an exposure condition in capturing the partial image based on image information related to an exposure setting image obtained when the imaging unit 10 captures the exposure setting image region P2 on the sample A set by the region setting unit 15. In the present embodiment, the exposure setting unit 16 determines an exposure condition in acquiring the partial image based on image information related to the exposure setting image region P2 illustrated in FIG. 2. In FIG. 2, a region P3 related to the partial image is hereinafter referred to as a "partial image region".

The HDR processing unit 17 combines a plurality of partial images acquired when the imaging unit captures the same region on the sample A under different exposure conditions based on the exposure condition set by the exposure setting unit 16, to generate an HDR image having an enlarged dynamic range.

The pasting processing unit 18 pastes a plurality of HDR images respectively generated for different regions of the sample A by the HDR processing unit 17 together, to acquire a pasted image having a higher angle of view.

The data recording unit 19 records an image captured by the imaging unit 10.

Figure 3:
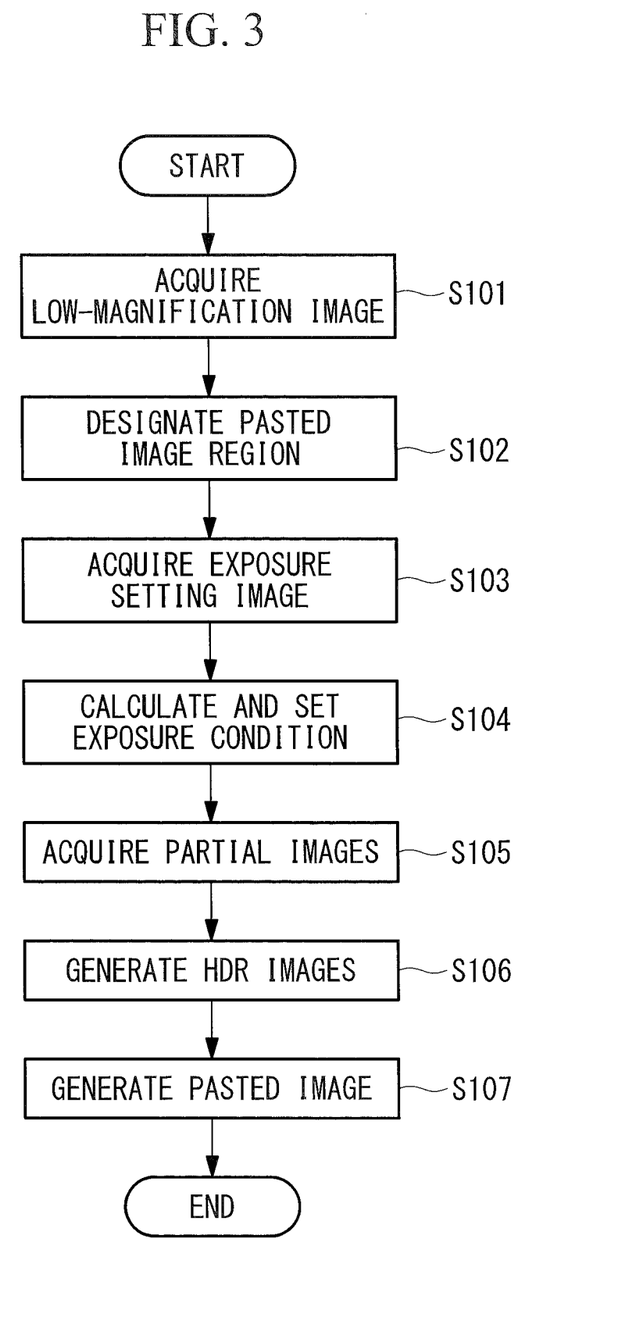
FIG. 3 is a flowchart in generating a pasted image in a microscope system including the image acquisition apparatus according to the first embodiment of the present invention.

The flow of generation of a pasted image by the microscope system including the image acquisition apparatus thus configured will be described below with reference to a flowchart illustrated in FIG. 3.

In step S101, the control unit 2 receives an instruction to capture the optical image of the sample A at a low magnification from the computer 3, and switches, among the plurality of objective lenses 9 mounted on the revolver 11, the objective lens 9 to the objective lens having a low magnification (e.g., a magnification of ×2). The imaging control unit 21 issues an instruction to capture the optical image of the sample A at a low magnification to the imaging unit 10 according to the instruction from the computer 3, and the imaging unit 10 captures a low-magnification image of the sample A upon receipt of the instruction (see a "region P" illustrated in FIG. 2). The captured low-magnification image is output to the data recording unit 19 included in the PC 3.

In step S102, the pasted image region P1 in the low-magnification image is designated. A user can designate the pasted image region P1 using the mouse 25 and the keyboard 24. The region setting unit 15 sets the pasted image region P1 upon receipt of the designation, and outputs information related to the set pasted image region P1 to the imaging control unit 21. The region setting unit 15 sets the exposure setting image region P2 serving as a range, which is wider by a predetermined range than the pasted image region P1 with the designation of the pasted image region P1, and outputs information related to the set exposure setting image region P2 to the imaging control unit 21.

In step S103, the control unit 2 switches the objective lens 9 into the objective lens 9 having a higher magnification (e.g., a magnification of ×4) than when the low-magnification image is acquired, and adjusts a zoom optical system, to set an imaging range to the exposure setting image region P2. Means for adjusting the zoom optical system corresponds to a magnification change unit capable of changing an imaging magnification. The imaging control unit 21 controls the imaging unit 10 according to the information from the region setting unit 15, acquires an exposure setting image for the exposure setting image region P2, and outputs image information related to the exposure setting image to the exposure setting unit 16.

In step S104, the exposure setting unit 16 sets an exposure condition in acquiring all partial images constituting a pasted image based on the image information related to the exposure setting image, and outputs the set exposure condition to the imaging control unit 21. That is, the exposure setting unit 16 sets the same exposure condition (an exposure time, etc.) for different partial image regions P3 based on the image information related to the exposure setting image.

In the present embodiment, four partial images are previously set to be acquired for one partial image region P3. In step S104, an appropriate reference exposure time is determined, for example, by so-called automatic exposure (AE) based on the image information related to the exposure setting image, and an exposure time that is four times the reference exposure time, an exposure time that is one-fourth the reference exposure time, and an exposure time that is one-sixteenth the reference exposure time are set in addition to the reference exposure time for the one partial image region P3.

Similarly, the exposure setting unit 16 sets parameters for gradation conversion processing for the partial images based on the image information related to the exposure setting image. In the present embodiment, the partial image is acquired as a 10-bit partial image, an HDR image, described below, is a 16-bit HDR image, and a pasted image is output as an 8-bit pasted image in consideration of display on a display. The parameters for gradation conversion (tone mapping) are set to obtain proper brightness in the conversion.

The tone mapping includes a method for changing a linear curve to a curve looking more natural, a method for calculating a proper luminance of an image while decreasing the resolution of the image, and a method for calculating an average luminance by measuring several frames. The same image looks different depending on a reference luminance.

An advanced method for the tone mapping includes a method for analyzing a histogram of an image, to extend the vicinity of a gradation in which pixel values are densely spaced and compress the vicinity of a gradation in which pixel values are coarsely spaced.

Figure 4A:
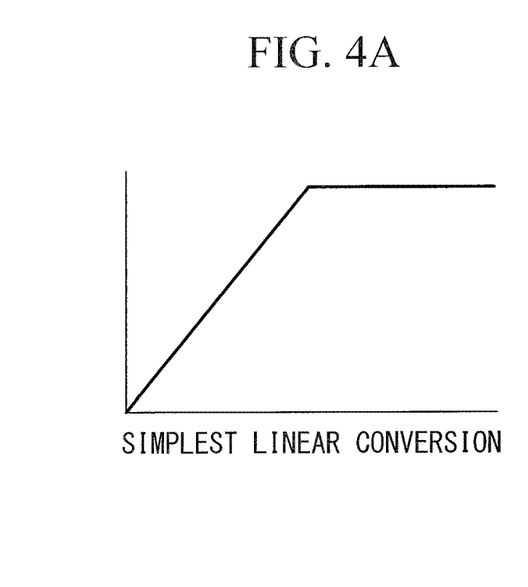
FIG. 4A is a graph related to description of a linear compression method for uniformly assigning an input luminance range of an image to an output luminance range of a display in tone mapping.
Figure 4B:
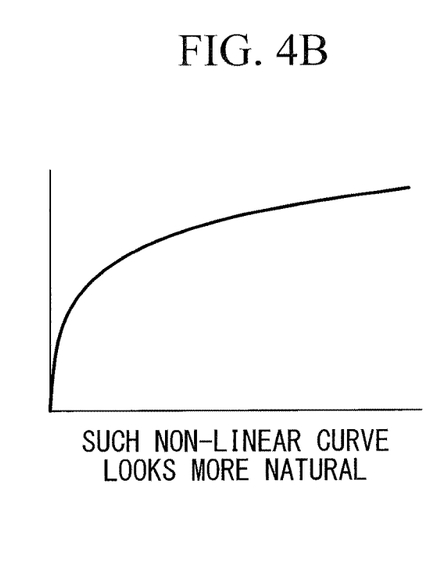
FIG. 4B is a graph related to description of a linear compression method for uniformly assigning an input luminance range of an image to an output luminance range of a display in tone mapping.
Figure 4C:
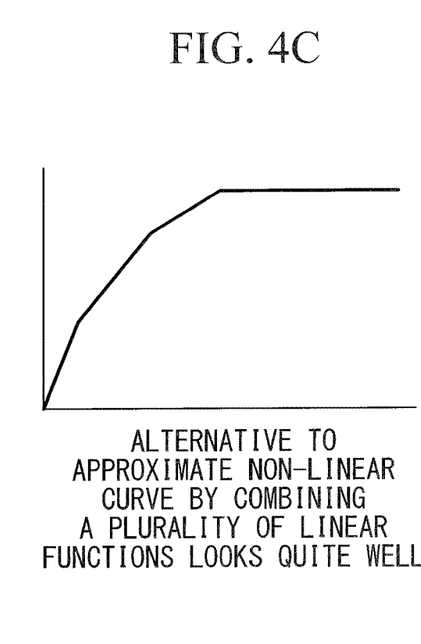
FIG. 4C is a graph related to description of a linear compression method for uniformly assigning an input luminance range of an image to an output luminance range of a display in tone mapping.

On the other hand, the simplest method for the tone mapping includes a linear compression method for uniformly assigning an input luminance range of an image to an output luminance range of a display. In this case, a relative contrast ratio in the image is stored. Thus, as a highlight portion is compressed, a contrast ratio of an intermediate luminance area or a shadow portion, which is considered to include important information, decreases at the same ratio. Thus, the image has small contrast as a whole (see FIGS. 4A, 4B, and 4C).

Figure 5:
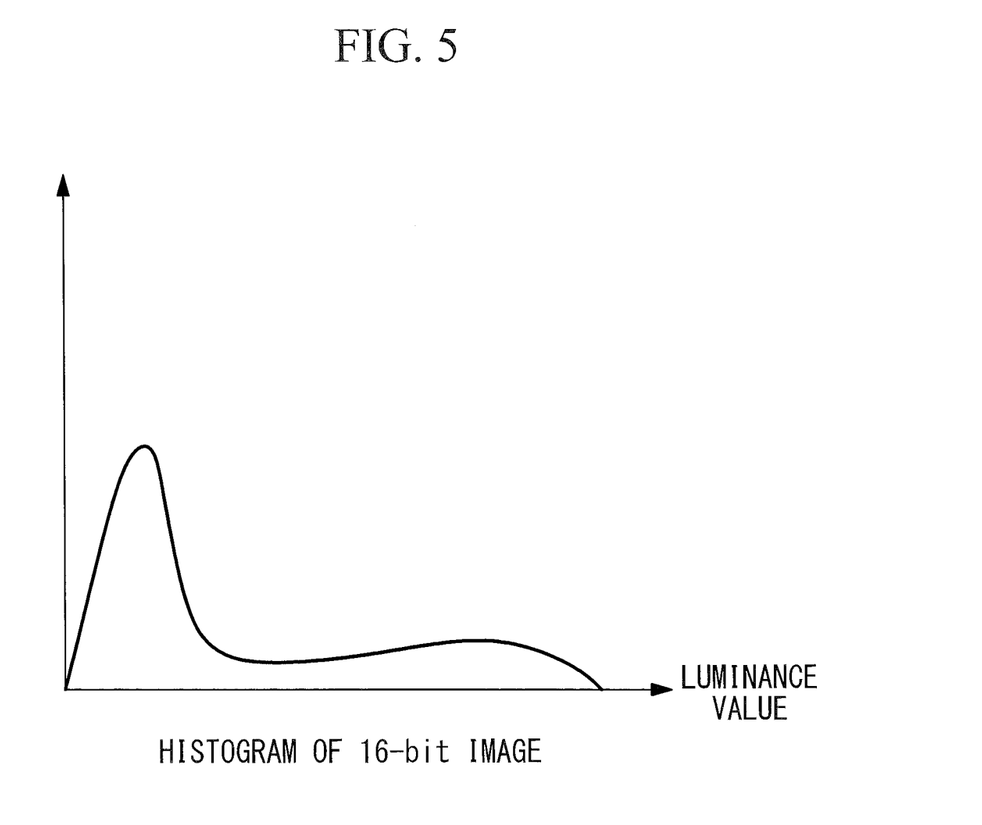
FIG. 5 illustrates an example of a tone curve applied when an image is compressed from 16 bits to 8 bits.
Figure 6A:
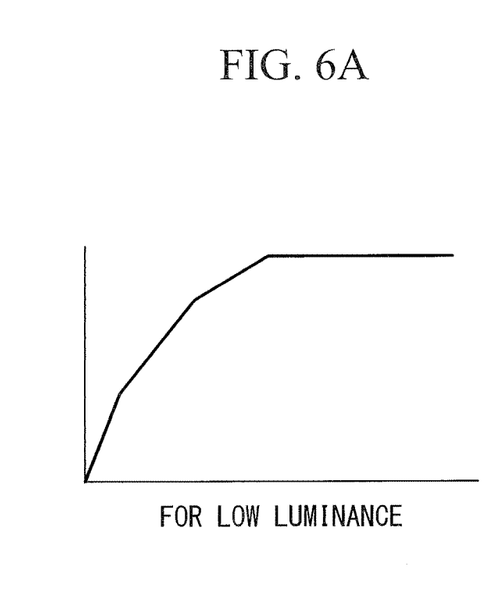
FIG. 6A illustrates an example of a tone curve for low luminance.
Figure 6B:
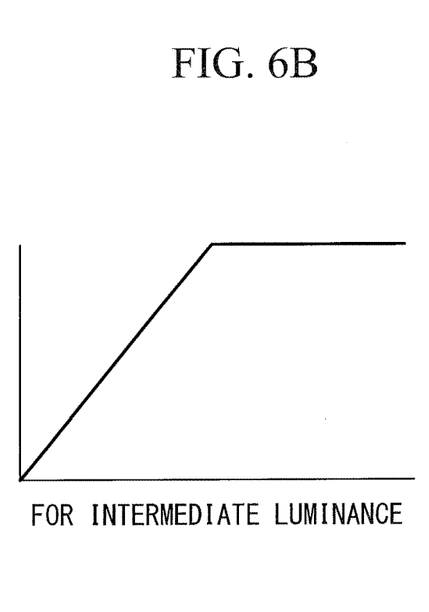
FIG. 6B illustrates an example of a tone curve for intermediate luminance.
Figure 6C:
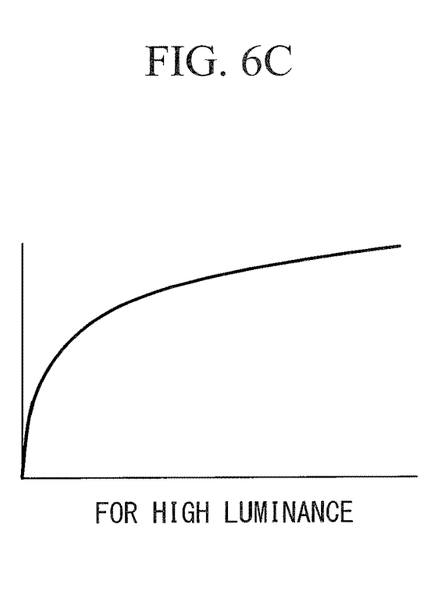
FIG. 6C illustrates an example of a tone curve for high luminance.

More specifically, a histogram is analyzed, and a luminance is classified into three patterns, i.e., a low luminance, an intermediate luminance, and a high luminance depending on whether luminance values are densely spaced. In the following example, the luminance is determined as the low luminance. As illustrated in FIG. 5, a tone curve applied when an image is compressed from 16 bits to 8 bits is calculated. While the tone curve can be calculated based on an average of luminance values in the entire image, the tone curve is selected from a tone curve for low luminance illustrated in FIG. 6A, a tone curve for intermediate luminance illustrated in FIG. 6B, and a tone curve for high luminance illustrated in FIG. 6C for simplification of description.

Figure 7:
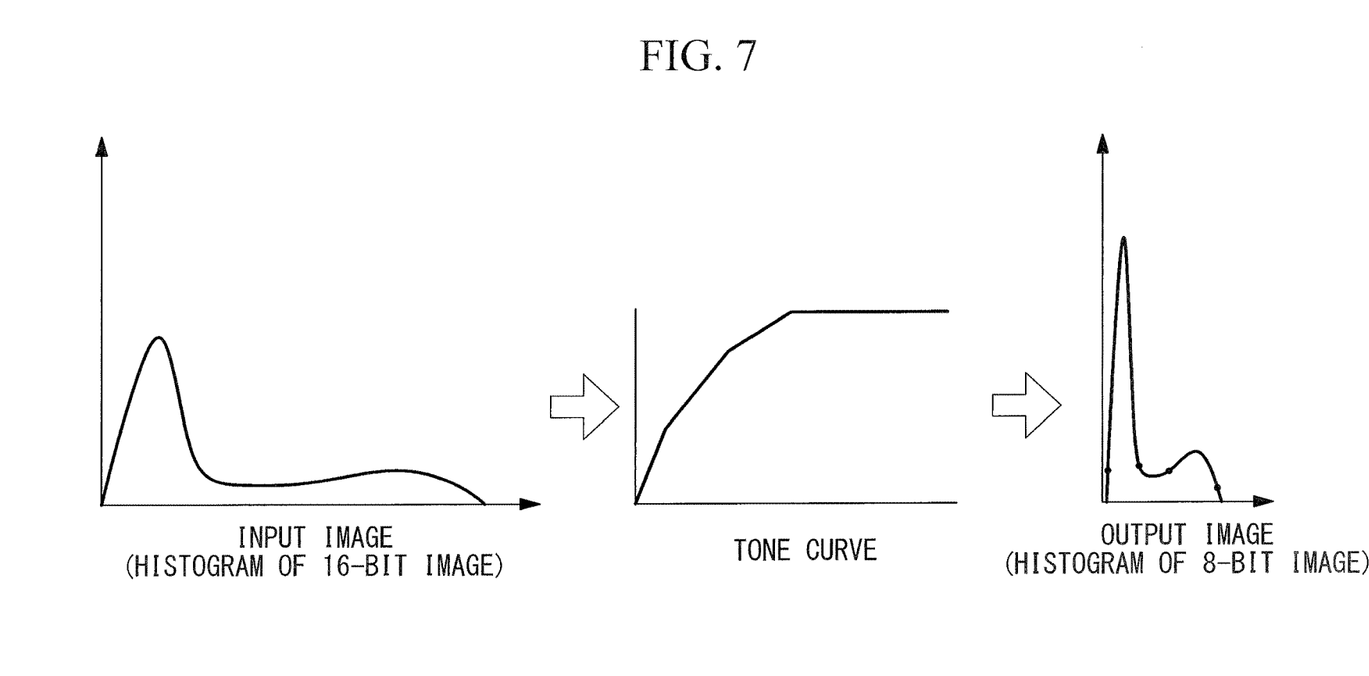
FIG. 7 illustrates an example of a case where the tone curve for low luminance is applied to generate an 8-bit output image (pasted image).
Figure 8:
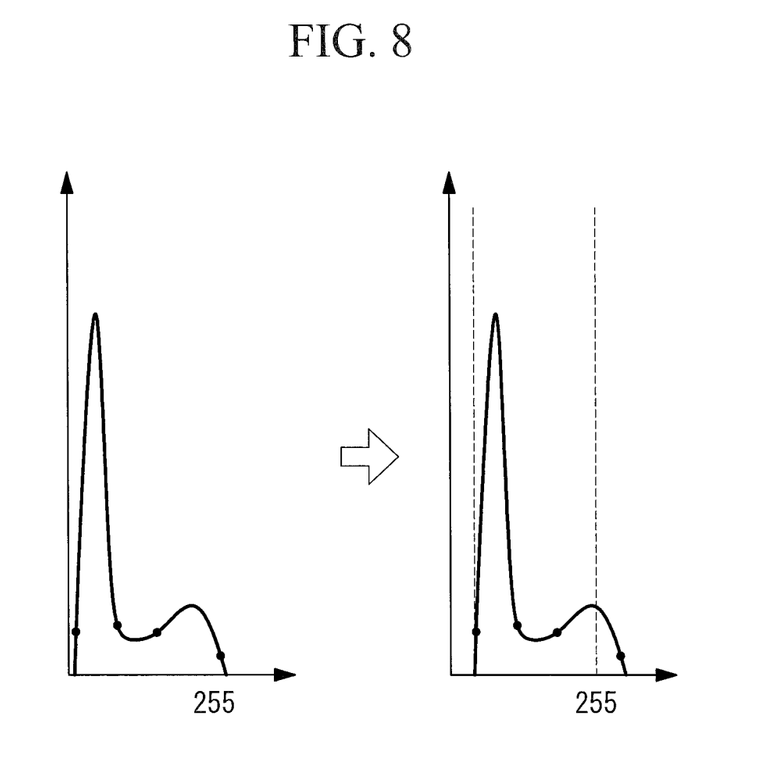
FIG. 8 illustrates an example of a case where the 8-bit output image is given an offset after the tone curve is applied.

In the low luminance, for example, the tone curve for low luminance is applied to an input image, to generate an 8-bit output image (pasted image), as illustrated in FIG. 7. To prevent a loss of shadow detail on the low luminance side, when needed, the output image can also be given an offset after the tone curve is applied to the input image (see FIG. 8).

In the aforementioned example, the tone curve to be calculated (selected) and the offset given after the application of the tone curve greatly affect the brightness of the image. When the tone curve and the offset are adjusted to match the sample A for each of the partial images, the generated pasted image is not uniform in brightness.

Therefore, in the present embodiment, an optimum image can be provided by calculating (selecting) a tone curve and an offset from the whole of images to be pasted together and pasting the images together. That is, the tone curve and the offset are calculated, i.e., parameters for gradation conversion are calculated based on the image information related to the exposure setting image related to the exposure setting image region P2 including the pasted image region P1 and having a slightly wider visual field than the pasted image region P1.

In step S105, the control unit 2 then sets the imaging range to the partial image region P3 by switching the objective lens 9 into the objective lens 9 having a higher magnification (e.g., a magnification of ×10, ×20, or ×40) than when the exposure setting image is acquired or adjusting the zoom optical system. The imaging unit 10 respectively acquires four partial images under different exposure conditions for the same region of the sample A according to the exposure condition set by the exposure setting unit 16, and outputs the acquired partial images to the data recording unit 19 included in the computer 3. A 10-bit image is acquired as the partial image here.

Then, the stage 8 is moved in the X-direction and the Y-direction, to move the imaging range from the partial image region P3 where the four partial images have been acquired to the adjacent partial image region P3. Then, the imaging unit 10 respectively acquires the four partial images for the same region of the sample A under similar exposure conditions, i.e., a reference exposure time, an exposure time that is four times the reference exposure time, an exposure time that is one-fourth the reference exposure time, and an exposure time that is one-sixteenth the reference exposure time, and outputs the acquired partial images to the data recording unit 19 included in the computer 3. This operation is repeated, to acquire the four partial images for each of all the partial image regions P3 within the pasted image region P1.

Figure 9:
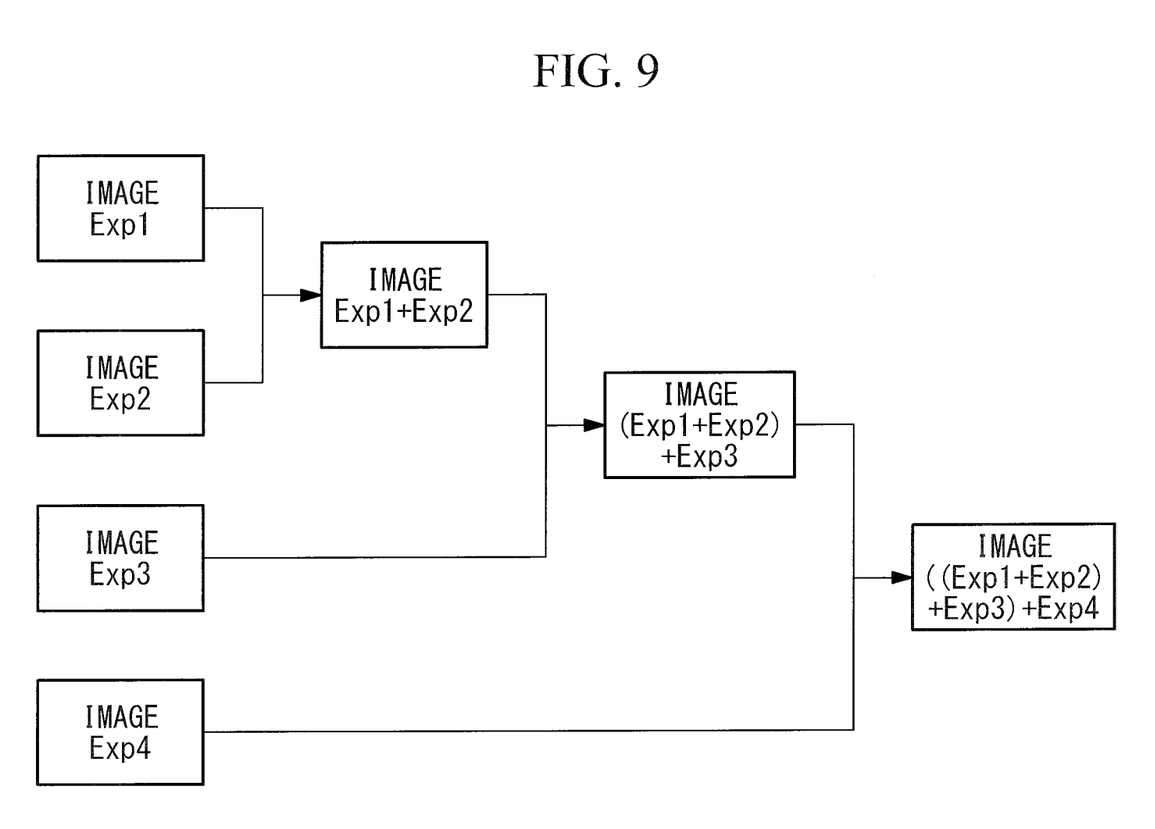
FIG. 9 illustrates HDR processing.

In step S106, the partial images for the same region, which have been acquired in step S105, are combined, to generate an HDR image having an enlarged dynamic range. More specifically, a method for starting with a partial image Exp1 (four times of the reference exposure condition) and replacing gradation information saturated in the partial image Exp1 with other different exposure images Exp2, Exp3, and Exp4 will be described, as illustrated in FIG. 9.

First, a saturated part of the partial image Exp1 is replaced with the partial image Exp2 (the reference exposure condition), to generate a temporary composite image, a saturated part of the temporary composite image is replaced with the partial image Exp3 (one-fourth of the reference exposure condition), to update the temporary composite image, and a saturated part of the temporary composite image is replaced with the partial image Exp4 (one-sixteenth of the reference exposure condition), to further update the temporary composite image, thereby to generate a 16-bit HDR image.

In step S107, the HDR images for the respective partial image regions, which have been generated in step S106, are pasted together, to generate a final pasted image.

Thus, in the microscope system according to the present embodiment, exposure in acquiring all the partial images is set based on the image information obtained by capturing the wider range than the pasted image to be acquired. Thus, a pasted image having a high quality can be obtained because the HDR images can be pasted together so that the brightness of the pasted image does not change for each of the HDR images and boundary lines among the HDR images do not become clear even by pasting processing. In this case, the exposure is based on the image information obtained by capturing the wider range. Even if the exposure condition greatly changes with location within a range of the pasted image, therefore, a common exposure in which a dynamic range can be enlarged can be set.

Although the exposure setting image region P2 is the range wider than the pasted image region P1 in the present embodiment, the exposure setting image region P2 may be the same range as the pasted image region P1.

Although the image for the exposure setting image region P2, which has been acquired in step S103, is the exposure setting image in the present embodiment, the exposure setting image need not be acquired in step S103. A part of the exposure setting image region P2 in the low-magnification image, which has been acquired in step S101, may be the exposure setting image, and image information related to the exposure setting image may be output to the exposure setting unit 16.

(Second Embodiment)

A second embodiment of the present invention will be described below.

A microscope system according to the present embodiment differs from the microscope system according to the aforementioned first embodiment in that parameters for exposure and gradation conversion as a reference are corrected before partial images are acquired.

Figure 11:
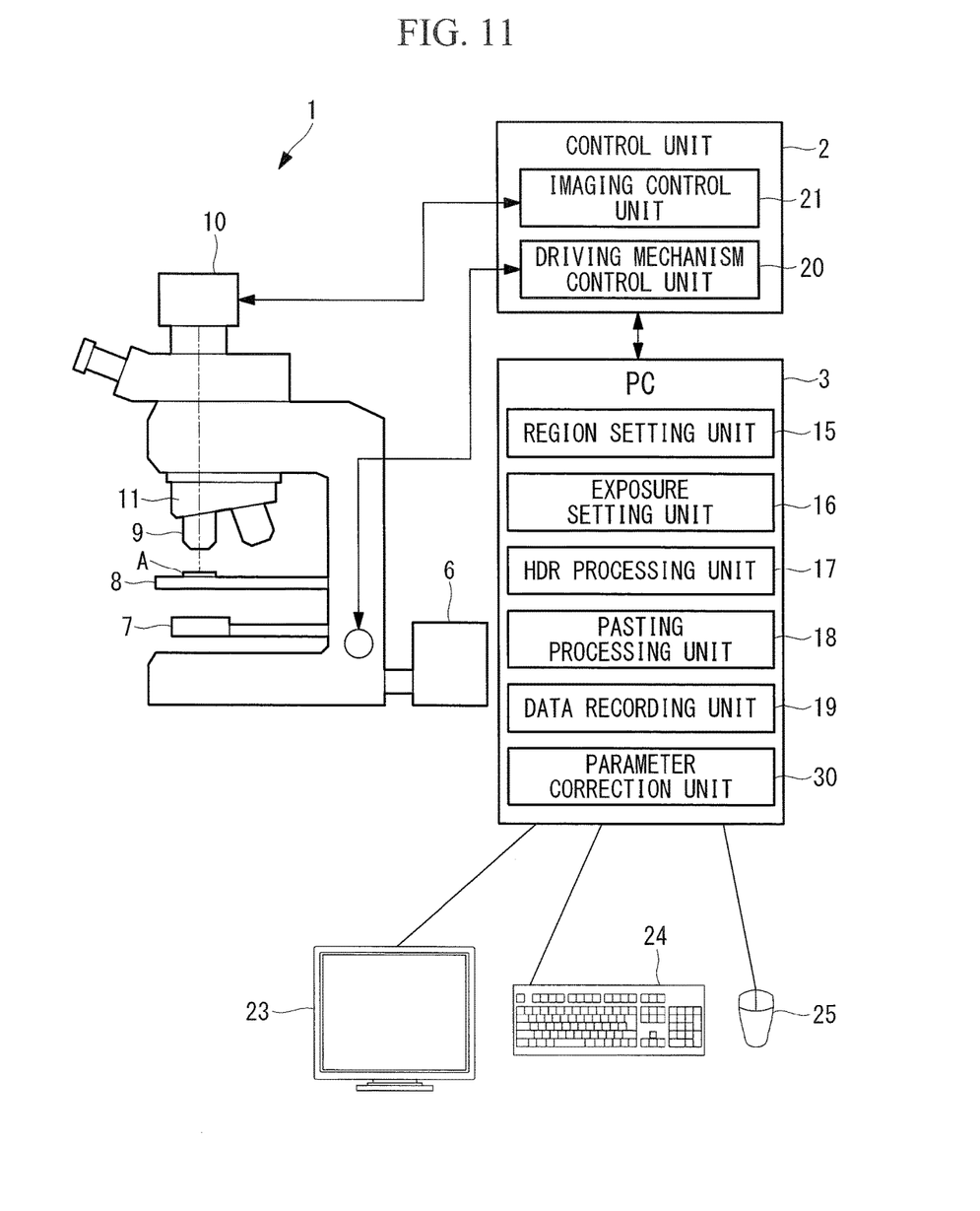
FIG. 11 is an entire configuration diagram illustrating an image acquisition apparatus according to a second embodiment of the present invention.

That is, as illustrated in FIG. 11, in a microscope system according to the present embodiment, a computer 3 further includes a parameter correction unit 30 as a processing unit implemented when a CPU rasterizes and executes a predetermined program.

Other components are the same as those in the first embodiment. The same components are assigned the same reference numerals, and hence description thereof is not repeated.

The parameters are corrected from the following reasons. That is, if a magnification is changed by switching an objective lens and adjusting a zoom optical system, the brightness of an image to be acquired changes due to changes in a visual field and an optical system. Therefore, the parameters for exposure and gradation conversion set from image information based on an exposure setting image may not be proper values when used as they are.

Figure 10:
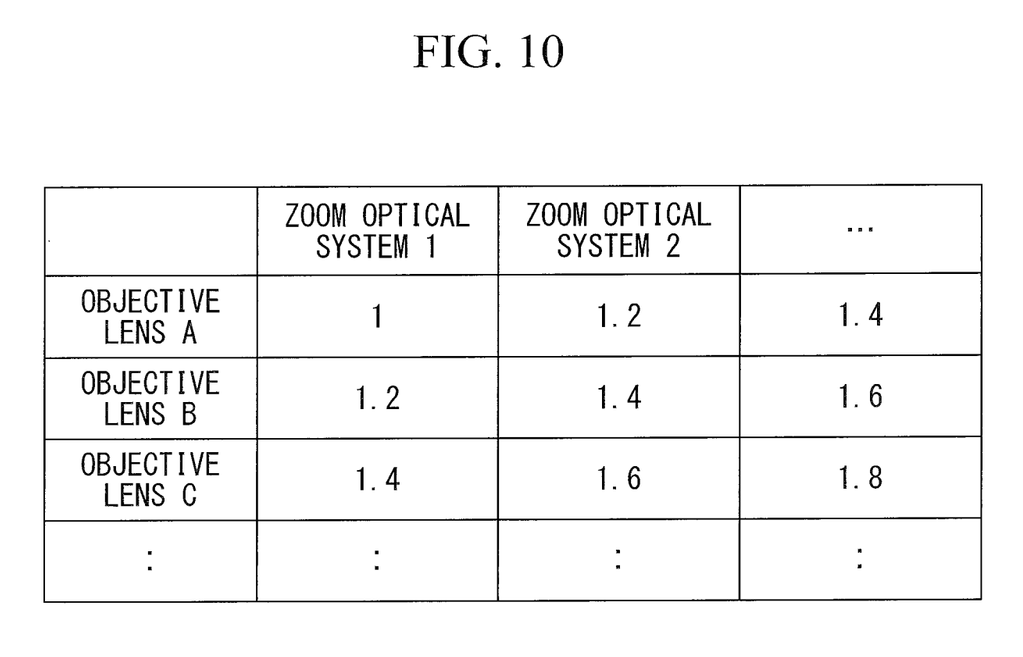
FIG. 10 illustrates an example of a table storing a correction coefficient in correcting an exposure condition.

Therefore, a table related to a correction coefficient as illustrated in FIG. 10 is previously retained according to the objective lens and the zoom optical system provided in the microscope system, for example. Therefore, the parameter correction unit 30 serving as the processing unit executed by the CPU corrects the parameters for exposure and gradation conversion.

Thus, an image having a desired brightness can be acquired by correcting the parameters for exposure and gradation conversion depending on an imaging magnification changed by a magnification change unit, i.e., according to the switched objective lens and zoom optical system. Therefore, a pasted image having a higher quality can be acquired.

(Third Embodiment)

A third embodiment of the present invention will be described below.

While the exposure condition applied when the partial images are acquired is calculated based on the image information related to the exposure setting image for the exposure setting image region P2 wider than the pasted image region P1 to be acquired, as illustrated in FIG. 2, in the microscope systems according to the aforementioned first and second embodiments, the exposure setting image need not necessarily be wider than the pasted image region P1, and can be an image in a region wider than the single partial image region P3 included in the pasted image region P1.

In a microscope system according to the present embodiment, parameters for exposure and gradation conversion applied when all partial images included in a pasted image are acquired are set based on an image in a wider visual field than the single partial image.

More specifically, after a pasted image region P1 is designated, a plurality of exposure setting images are acquired for a plurality of partial image regions P3 included in a pasted image region P1 using a region wider than the single partial image region P3 as an exposure setting image region while a stage 8 is moved in an X-direction and a Y-direction. Parameters for exposure and gradation conversion applied when all the partial images included in the pasted image are acquired are set by selecting from the acquired plurality of exposure setting images their average and maximum values, for example.

Thus, a more appropriate exposure can be set depending on the number of places to be scanned, i.e., places where the exposure setting image is acquired. Thus, an image having desired brightness can be acquired. Therefore, a pasted image having a higher quality can be acquired.

While an exposure condition applied when all the partial images are acquired from the plurality of exposure setting images is set in the present embodiment, the exposure condition may be set from the exposure setting image in the one place.

(Fourth Embodiment)

A fourth embodiment of the present invention will be described below.

While the exposure condition applied when the partial images are acquired is calculated based on the image information related to the exposure setting image for the exposure setting image region P2 wider than the pasted image region P1 to be acquired, as illustrated in FIG. 2, in the microscope systems according to the aforementioned first and second embodiments, all the image information related to the exposure setting image need not necessarily be used, and only required image information can also be used.

That is, in a microscope system according to the present embodiment, an exposure setting image serving as an image in a wider visual field than a pasted image to be acquired is acquired, a place used for exposure setting in the exposure setting image is selected by designation of a user, and parameters for exposure and gradation conversion are set based on image information related to the selected place.

Thus, more appropriate exposure can be set depending on the number of places to be scanned, i.e., places where the exposure setting image is acquired. Thus, an image having desired brightness can be acquired. Therefore, a pasted image having a higher quality can be acquired.

In the aforementioned embodiments, the microscope system may include a magnification change unit capable of changing an imaging magnification. The exposure setting unit may set an exposure condition based on image information acquired by the imaging unit when the magnification change unit sets the imaging magnification to an imaging magnification at which an image in a wider range than the single partial image can be acquired.

Thus, when the magnification change unit sets the imaging magnification to the imaging magnification at which the image in the wider range than the single partial image can be acquired, the imaging unit acquires the image in the wider range than the single partial image, and the exposure setting unit sets the exposure condition in acquiring all the partial images based on the image information related to the image. Thus, a pasted image having a high quality, in which the brightness thereof does not change for each of the HDR images and boundary lines among the HDR images are inconspicuous even if pasting processing is performed, can be obtained.

In the aforementioned embodiments, the microscope system may include a parameter correction unit that corrects the exposure condition set depending on the imaging magnification changed by the magnification change unit.

When the imaging magnification is changed, i.e., an objective lens or a zoom optical system is changed, the brightness of the image to be acquired changes. Thus, a desired image may be unable to be acquired even by merely applying the set exposure condition. Therefore, an image having a desired brightness can be acquired by correcting the exposure condition depending on the imaging magnification changed by the magnification change unit, i.e., according to the switched objective lens or zoom optical system.

In the aforementioned embodiments, the exposure setting unit may set an exposure condition in capturing all the partial images based on image information acquired when the imaging unit captures a wider range than the pasted image.

Thus, the exposure condition in acquiring all the partial images is set by determining an appropriate exposure condition over an entire imaging range based on the image information obtained by imaging the wider range than the pasted image. Thus, a pasted image having a high quality and having an enlarged dynamic range can be obtained because the HDR images generated from the partial images included in the pasted image can be pasted together so that the brightness of the pasted image does not change for each of the HDR images and boundary lines among the HDR images do not become clear even by pasting processing.

In the aforementioned embodiments, the exposure setting unit may select image information in a predetermined range from the image information in the wider range than the single partial image acquired by the imaging unit and set an exposure condition based on the selected image information.

Thus, the exposure condition is set from only the selected range. Thus, an exposure condition corresponding to a required range can be set. Therefore, a more appropriate exposure condition can be set, and a pasted image having a higher quality can be obtained.

In the aforementioned embodiments, the exposure setting unit may set an exposure condition based on image information acquired by the imaging unit for a range in which the plurality of partial images are acquired.

Thus, an exposure condition can be set from the image information acquired by the imaging unit according to a region designated by a user and a desired condition, for example. Therefore, an appropriate exposure condition can be set, and a pasted image having a higher quality can be obtained.

REFERENCE SIGNS LIST

1 microscope
2 control unit
3 computer (PV)
8 stage
9 objective lens
10 imaging unit
15 region setting unit
16 exposure setting unit
17 HDR processing unit
18 pasting processing unit
20 driving mechanism control unit
21 imaging control unit

The invention claimed is:

1. An image acquisition apparatus comprising:
an optical system comprising a plurality of objective lenses;
an image sensor configured to acquire images at different magnifications in conjunction with different ones of the plurality of objective lenses;
an actuator configured to be controlled to move an object to be imaged relative to the image sensor; and
a processor comprising hardware, wherein the processor is configured to perform processes comprising:
setting the optical system to a first objective lens having a first magnification, of the plurality of objective lenses, to set a first imaging range of the image sensor to an exposure setting region of the object;
controlling the image sensor to acquire, in conjunction with the first objective lens, an exposure setting image of the exposure setting region of the object;
setting the optical system to a second objective lens, having a second magnification higher than the first magnification, of the plurality of objective lenses to set a second imaging range, the second imaging range being smaller than the first imaging range, of the image sensor to one of a plurality of partial image regions, wherein each of the plurality of partial image regions is smaller than the exposure setting region, and controlling the actuator to repeatedly move the object relative to the image sensor to set the imaging range of the image sensor to each of the plurality of partial image regions;

setting a reference exposure time based on image information related to the exposure setting image acquired at the first magnification lower than the second magnification;

setting a plurality of exposure times at which the image sensor acquires a plurality of partial images of each of the plurality of partial regions of the object, based on the reference exposure time;

controlling the image sensor to acquire the plurality of partial images of the each of the plurality of partial regions of the object, wherein each of the plurality of partial images of the each of the plurality of partial regions of the object is acquired at a corresponding one of the plurality of exposure conditions;

generating a high dynamic range image of the each of the plurality of partial regions of the object based on the plurality of partial images of the each of the plurality of partial regions of the object; and generating a pasted image by pasting together the high dynamic range image of the each of the plurality of partial regions of the object.

2. The image acquisition apparatus according to claim 1, wherein the processor is configured to perform:
setting the plurality of exposure times based on the first magnification and the second magnification.

3. The image acquisition apparatus according to claim 1, wherein the exposure setting region has a wider range than a range of the pasted image.

4. The image acquisition apparatus according to claim 1, wherein the processor is configured to perform:
setting the plurality of exposure times at which the image sensor acquires the plurality of partial images of the each of the plurality of partial regions of the object, based on image information related to a predetermined range of the exposure setting image.

5. The image acquisition apparatus according to claim 1, wherein the processor is configured to perform:
setting the plurality of exposure times at which the image sensor acquires the plurality of partial images of the each of the plurality of partial regions of the object, based on image information related to a range of the exposure setting image in which the plurality of partial images are acquired.

6. An image acquisition apparatus comprising:
a processor comprising hardware, wherein the processor is configured to perform processes comprising:
setting an optical system comprising a plurality of objective lenses to a first objective lens having a first magnification, to set a first imaging range of an image sensor, that is configured to acquire images at different magnifications in conjunction with different ones of the plurality of objective lenses, to an exposure setting region of an object;

controlling the image sensor to acquire, in conjunction with the first objective lens, an exposure setting image of the exposure setting region of the object;

setting the optical system to a second objective lens, having a second magnification higher than the first magnification, of the plurality of objective lenses to set a second imaging range, the second imaging range being smaller than the first imaging range, of the image sensor to one of a plurality of partial image regions, wherein each of the plurality of partial image regions is smaller than the exposure setting region, and controlling an actuator to repeatedly move the object relative to the image sensor to set the imaging range of the image sensor to each of the plurality of partial image regions;

setting a reference exposure time based on image information related to the exposure setting image acquired at the first magnification lower than the second magnification;

setting a plurality of exposure times at which the image sensor acquires a plurality of partial images of each of the plurality of partial regions of the object, based on the reference exposure time;

controlling the image sensor to acquire the plurality of partial images of the each of the plurality of partial regions of the object, wherein each of the plurality of partial images of the each of the plurality of partial regions of the object is acquired at a corresponding one of the plurality of exposure conditions;

generating a high dynamic range image of the each of the plurality of partial regions of the object based on the plurality of partial images of the each of the plurality of partial regions of the object; and generating a pasted image by pasting together the high dynamic range image of the each of the plurality of partial regions of the object.

7. A non-transitory computer readable storage device storing instructions that, when executed, causes a computer to perform processes comprising:
setting an optical system comprising a plurality of objective lenses to a first objective lens, having a first magnification, to set a first imaging range of an image sensor, that is configured to acquire images at different magnifications in conjunction with different ones of the plurality of objective lenses, to an exposure setting region of an object;

controlling an image sensor to acquire, in conjunction with the first objective lens, an exposure setting image of the exposure setting region of the object;

setting the optical system to a second objective lens, having a second magnification higher than the first magnification, of the plurality of objective lenses to set a second imaging range, the second imaging range being smaller than the first imaging range, of the image sensor to one of a plurality of partial image regions, wherein each of the plurality of partial image regions is smaller than the exposure setting region, and controlling an actuator to repeatedly move the object relative to the image sensor to set the imaging range of the image sensor to each of the plurality of partial image regions;

setting a reference exposure time based on image information related to the exposure setting image acquired at the first magnification lower than the second magnification;

setting a plurality of exposure times at which the image sensor acquires a plurality of partial images of each of the plurality of partial regions of the object, based on the reference exposure time;

controlling the image sensor to acquire the plurality of partial images of the each of the plurality of partial regions of the object, wherein each of the plurality of partial images of the each of the plurality of partial regions of the object is acquired at a corresponding one of the plurality of exposure conditions;

generating a high dynamic range image of the each of the plurality of partial regions of the object based on the plurality of partial images of the each of the plurality of partial regions of the object; and
generating a pasted image by pasting together the high dynamic range image of the each of the plurality of partial regions of the object.

\* \* \* \* \*